(12) United States Patent
Dove et al.

(10) Patent No.: US 12,116,874 B1
(45) Date of Patent: Oct. 15, 2024

(54) METHOD FOR NEUTRALIZING HYDROGEN SULFIDE IN A WELLBORE WITH A VENTURI JET PUMP AND OXIDANTS

(71) Applicant: Tech Flo Consulting, LLC, Conroe, TX (US)

(72) Inventors: Larry Dove, Conroe, TX (US); Erik Reissig, Conroe, TX (US); Von Krosigk, Conroe, TX (US)

(73) Assignee: Tech Flo Consulting, LLC, Conroe, TX (US)

( * ) Notice: Subject to any disclaimer, the term of this patent is extended or adjusted under 35 U.S.C. 154(b) by 0 days.

(21) Appl. No.: 17/731,667

(22) Filed: Apr. 28, 2022

(51) Int. Cl.
*E21B 43/12* (2006.01)
*C09K 8/532* (2006.01)
*E21B 43/24* (2006.01)

(52) U.S. Cl.
CPC ............ *E21B 43/124* (2013.01); *C09K 8/532* (2013.01); *C09K 2208/20* (2013.01)

(58) Field of Classification Search
None
See application file for complete search history.

(56) References Cited

U.S. PATENT DOCUMENTS

| | | | | |
|---|---|---|---|---|
| 4,151,260 A | * | 4/1979 | Woertz | E21B 43/34 423/234 |
| 4,361,487 A | * | 11/1982 | Hills | C02F 1/722 210/759 |
| 4,395,385 A | * | 7/1983 | Welsh | B01D 53/1493 423/566.2 |
| 4,473,115 A | * | 9/1984 | Oakes | E21B 41/02 166/371 |
| 7,048,786 B1 | * | 5/2006 | Von Krosigk | C02F 1/34 210/243 |
| 7,270,314 B1 | * | 9/2007 | Von Krosigk | C02F 1/005 261/76 |

* cited by examiner

*Primary Examiner* — Charles R Nold
(74) *Attorney, Agent, or Firm* — Tumey L.L.P.

(57) ABSTRACT

A method for neutralizing hydrogen sulfide in a well using oxidants by installing a venturi jet pump between a packer and a tubing string in a reservoir, injecting oxidant into water forming a power fluid using a surface tension modification generator; continuously injecting the power fluid into tubing in the source well or oil field production well at 50 psi-5000 psi to an inlet nozzle of the venturi jet pump. Velocity increases and pressure decreases on the power fluid as fluid flows through the inlet nozzle. Simultaneously drawing in reservoir fluid and mixing with the power fluid in a draw down chamber forming a molecularly mixed fluid. Mixing oxidant with reservoir fluid for 0.1 to 10 seconds to scavenge hydrogen sulfide, methyl sulfide and/or explode cell membranes of anaerobic bacteria of the reservoir and discharging the treated stream from the venturi jet pump up an annulus of the wellbore to surface.

24 Claims, 7 Drawing Sheets

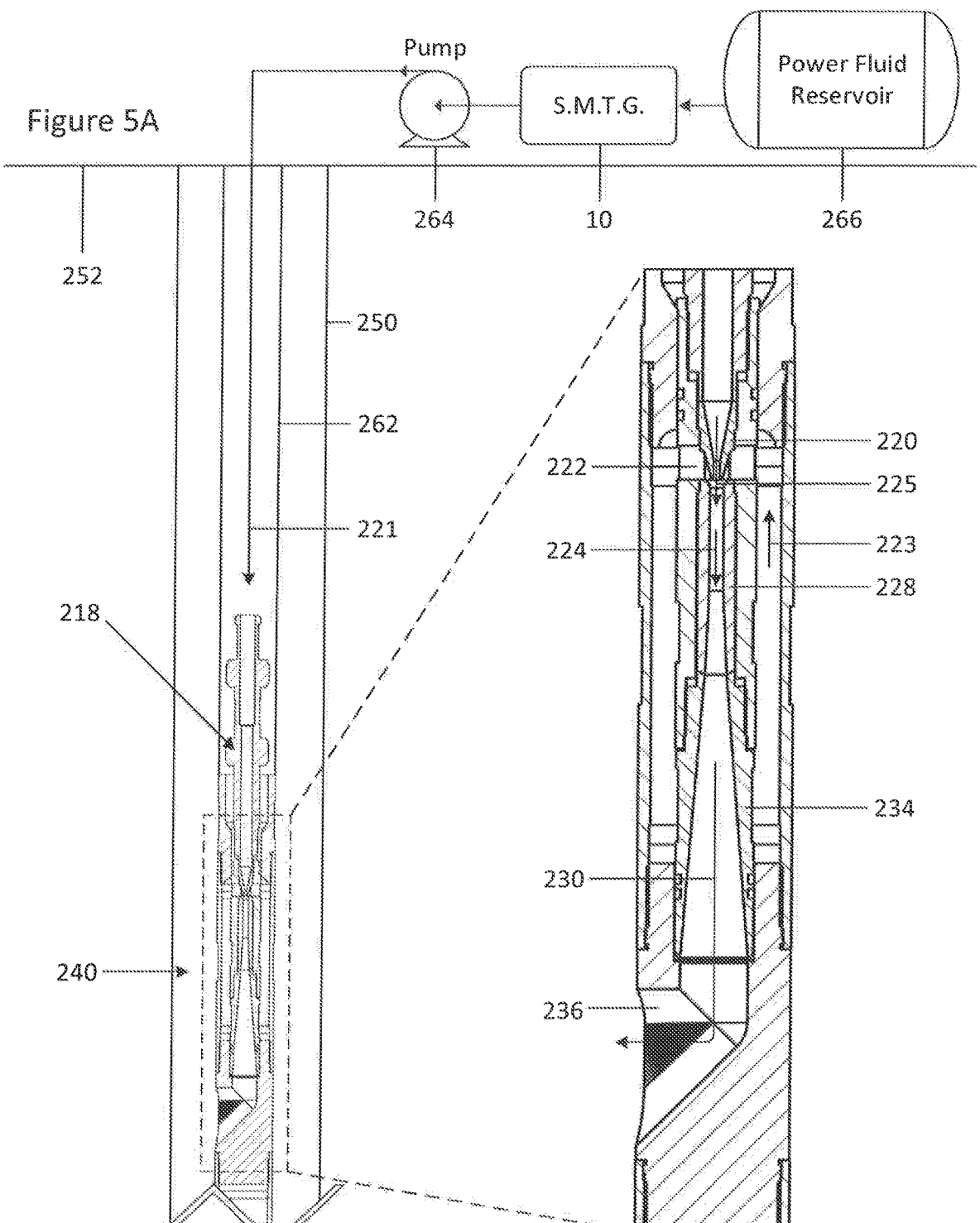

FIGURE 6A

- 100 — INSTALL A VENTURI JET PUMP BETWEEN A PACKER AND A TUBING STRING INSTALLED IN A WELLBORE OF SOURCE WELL OR A WELLBORE OF AN OIL FIELD PRODUCTION WELL IN A RESERVOIR

- 102 — INJECT AN OXIDANT INTO WATER ABOVE GROUND FORMING A POWER FLUID WITH A SURFACE TENSION MODIFICATION GENERATOR

- 104 — CONTINUOUSLY INJECT THE POWER FLUID INTO TUBING IN THE SOURCE WELL OR OIL FIELD PRODUCTION WELL AT AN INITIAL SURFACE PRESSURE BETWEEN 50PSI AND 5000 PSI TO AN INLET NOZZLE OF THE VENTURI JET PUMP

- 106 — INCREASE VELOCITY AND DECREASE PRESSURE OF THE POWER FLUID AS THE POWER FLUID TRAVERSES THE INLET NOZZLE FORMING AN INCREASED VELOCITY POWER FLUID

- 108 — SIMULTANEOUSLY DRAW RESERVOIR FLUID FROM THE RESERVOIR INTO THE VENTURI JET PUMP AND MIX THE INCREASED VELOCITY POWER FLUID WITH RESERVOIR FLUID IN A DRAW DOWN CHAMBER OF THE VENTURI JET PUMP FORMING A MOLECULARLY MIXED FLUID

FIGURE 6B

110 — IN A MIXING TUBE OF THE VENTURI JET PUMP CONNECTED TO THE DRAWN DOWN CHAMBER, REACTING THE OXIDANT WITH THE RESERVOIR FLUID IN A PERIOD OF TIME FROM 0.1 TO 10 SECONDS TO PERFORM AT LEAST ONE OF: SCAVENGE HYDROGEN SULFIDE FORMING A SULFATE; SCAVANGE METHYL SULFIDE FORMING A SULFATE; AND EXPLODE CELL MEMBRANES OF ANAEROBIC BACTERIA OF THE RESERVOIR FLUID FORMING A TREATED STREAM

112 — DISCHARGE THE TREATED STREAM FROM THE VENTURI JET PUMP UP AN ANNULUS OF THE WELLBORE TO THE SURFACE

114 — SEPARATE THE TREATED STREAM INTO A POWER FLUID AND A PRODUCED FLUID STREAM

METHOD FOR NEUTRALIZING HYDROGEN SULFIDE IN A WELLBORE WITH A VENTURI JET PUMP AND OXIDANTS

FIELD

This invention relates to the field of hydrocarbon production processes and more specifically relates to a method for neutralizing hydrogen sulfide (H2S) in a wellbore with a venturi jet pump and oxidants.

BACKGROUND

Hydrogen sulfide, a colorless, poisonous, corrosive, and flammable gas. Hydrogen sulfide is readily soluble in solvents such as water, alcohols and hydrocarbons. In significant concentrations, its presence in the wellbore may result in damage to wellbore components or dangerous conditions for well operators at the surface. The existence of hydrogen sulfide in reservoir fluid may prevent an operator from safely flowing a well to the surface and to carrying out a proper evaluation of a well.

Some hydrocarbon wells can contain a relatively high concentration of hydrogen sulfide, which is also known as acid gas or sour gas. Because hydrogen sulfide can be toxic and corrosive it requires safety precautions be undertaken if the hydrogen sulfide reaches the surface. Elevated amounts of hydrogen sulfide may place operating personnel and the population in nearby areas at risk.

Hydrogen sulfide also increases the probability of surface equipment failure. For example, hydrogen sulfide can cause sulfide stress cracking. Hardened steel is more susceptible to sulfide stress cracking at lower temperatures. High strength carbon steel becomes brittle when exposed to sulfide stress cracking and develops cracks, which can lead to failure of the components formed of such steel. Surface equipment on a drilling rig or production facilities can require the use special hydrogen sulfide resistant steel and rubber elements to avoid catastrophic failure or the release of poisonous gas in and around working area.

Numerous approaches to control hydrogen sulfide downhole have been developed and include solid scavengers (i.e., such as zinc oxide or other metal oxides) for complexing hydrogen sulfide in solid form, liquid scavengers (i.e., such as amines, morpholine, or acrolein) for complexing hydrogen sulfide in liquid form, and oxidizing chemicals (i.e., mild oxidizers such as nitrite or long-chain amine oxides and strong oxidizers such as peroxides) that convert hydrogen sulfide to more harmless forms of sulfur such as elemental sulfur or thiosulfate. However, delivery of agents downhole in manner that efficiently neutralizes hydrogen sulfide remain elusive. A need exists for a method for neutralizing hydrogen sulfide in a wellbore to improve flow through the well. The present embodiments meet these needs.

BRIEF SUMMARY OF THE INVENTION

The invention is a method for neutralizing hydrogen sulfide in a well using a venturi jet pump between a packer and a tubing string to inject a power fluid having an oxidant into a well. The power fluid may be generated using a surface tension modification generator to combine the oxidant with the power fluid. The power fluid can be continuously injected the power into the tubing in the source well or oil field production well through an inlet nozzle. Velocity increases and pressure decreases on the power fluid as fluid flows through the inlet nozzle. This action simultaneously draws in reservoir fluid which mixes with the power fluid in a draw down chamber forming a molecularly mixed fluid. Mixing oxidant with the reservoir fluid scavenges hydrogen sulfide, methyl sulfide and/or explodes cell membranes of anaerobic bacteria of the reservoir. Treated steam can then be discharged from the venturi jet pump up an annulus of the wellbore to the surface.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF THE DRAWINGS

The detailed description will be better understood in conjunction with the accompanying drawings as follows:

FIGS. 5A and 5B depict a cross sectional view and a detailed cross-sectional view of an embodiment of the venturi jet pump assembly usable in the novel method.

FIGS. 6A-B depicts a diagram of steps of the novel method.

Figure 1:
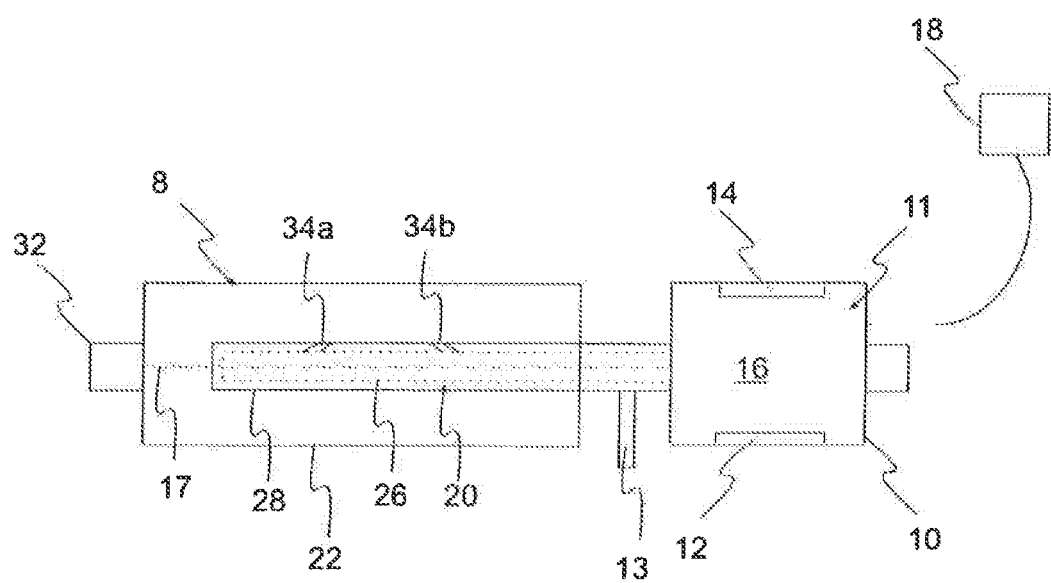
FIGS. 1A-C depict an overall diagram of an embodiment of the apparatus.
Figure 2:
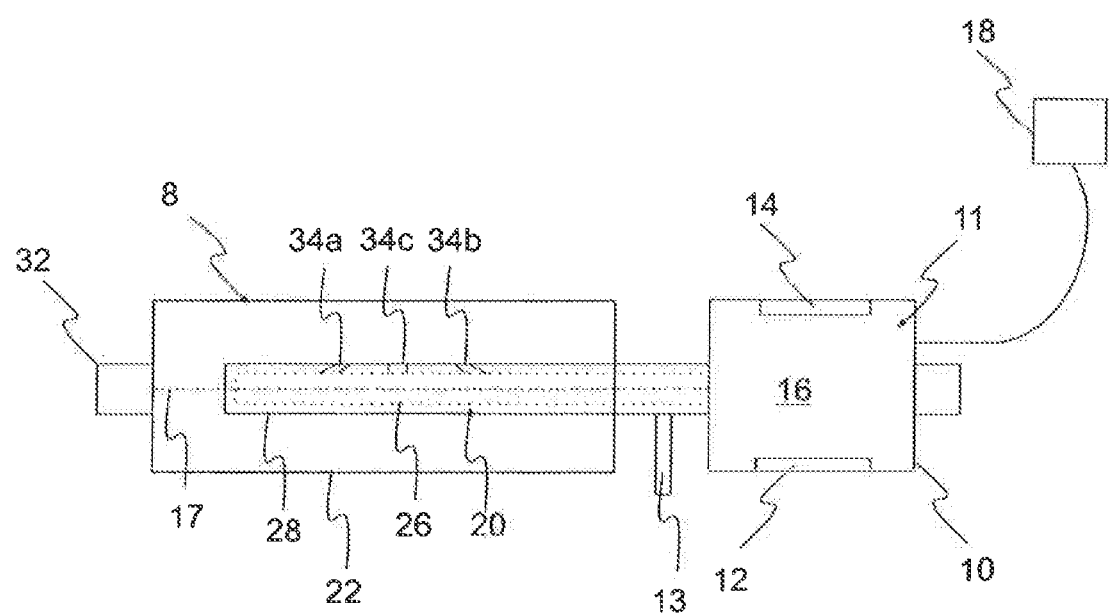
FIG. 2 depicts a perspective view of an embodiment of the first inner chamber with three funnels.
Figure 3:
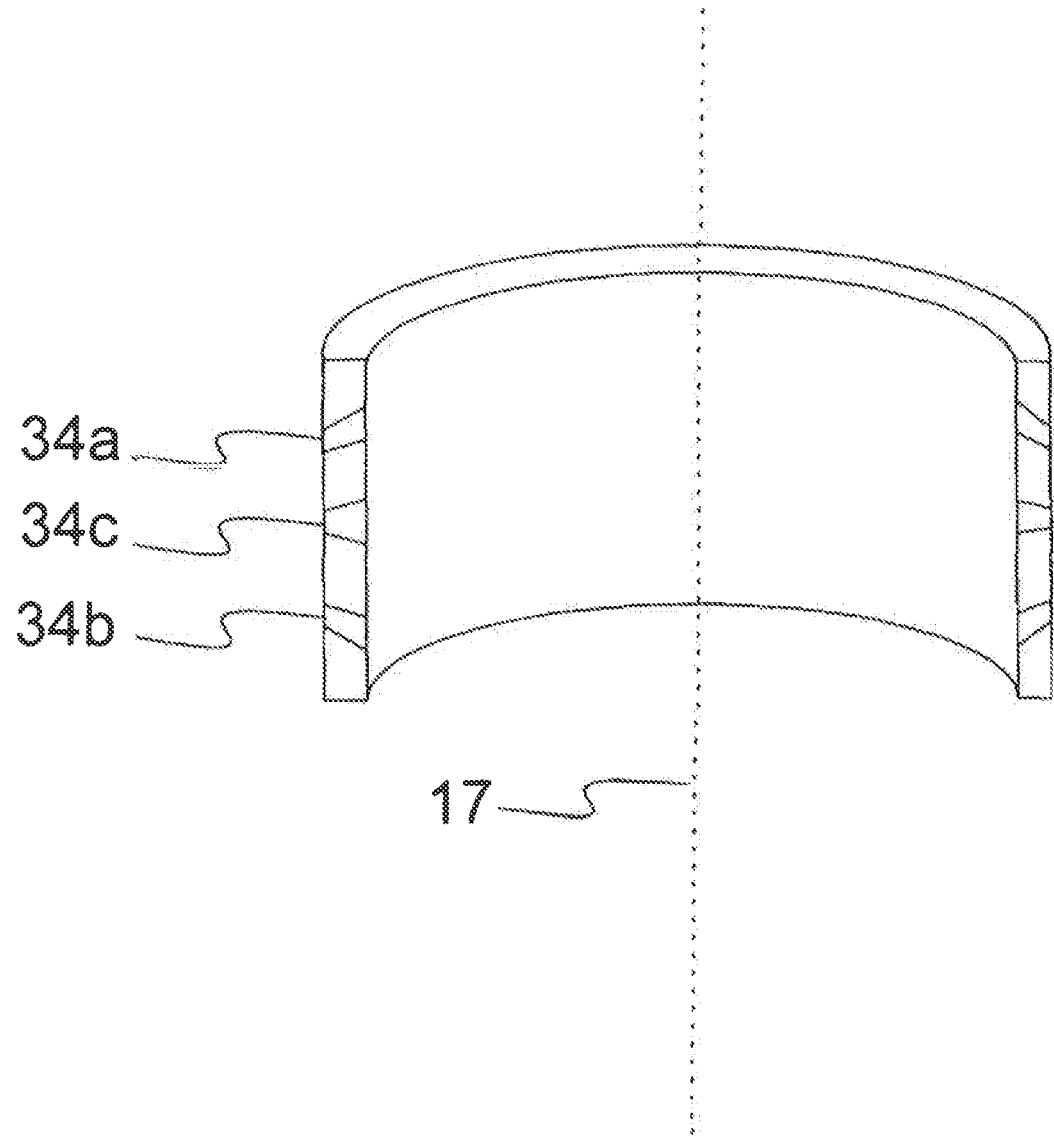
FIG. 3 depicts a cross section of the funnels of FIG. 2.
Figure 4:
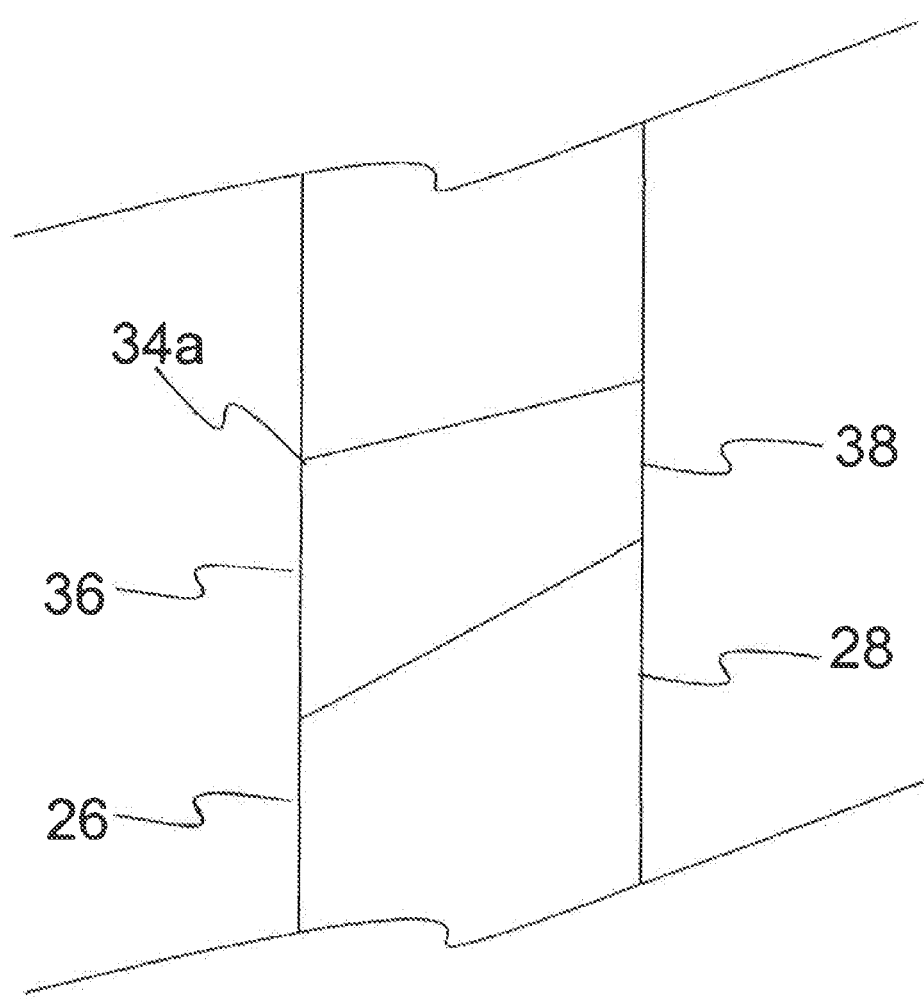
FIG. 4 depicts a cross sectional view of two of the funnels in the inner chamber.

The present embodiments are detailed below with reference to the listed Figures.

Definitions

The following definitions shall be used herein:

The term "draw down chamber" of the venturi jet pump refers to an area between the inlet nozzle and a mixing tube in which a power fluid is mixed with a reservoir fluid without the need for moving parts or additional equipment.

The term "increased velocity power fluid" refers to a power fluid that has increased in velocity fluid from 5 ft/sec to 500 ft/sec.

The term "inlet nozzle" of the venturi jet pump refers to a restriction the moves the power fluid from outside the venturi jet pump to a draw down chamber of the venture jet pump while decreasing pressure of the power fluid and increasing velocity of the power fluid. As an example, the venture jet pump inlet nozzle can decrease pressure of the power fluid from 2000 psi to 1000 psi without including pressure for hydrostatic head, and increase power fluid velocity from 20 ft/sec to 200 ft/sec.

The term "molecularly mixed fluid" refers to the power fluid combined with the reservoir fluid.

The term "oil field production well" as used herein refers to any in-ground well producing oil or other similar hydrocarbons in liquid, gas or mixed liquid and gas states, and may include emulsions of hydrocarbon liquid and gas in water.

The term "oxidant" as used herein refers to at least one of: ozone, chlorine dioxide; a hydrogen peroxide or hydrogen.

The term "ozone" as used herein refers to a gas of oxygen with three protons. The ozone of this method is pumped down hole in solution at a concentration from 0.1 ppm to 10 ppm. The concentration of the ozone in the ozonated fluid can vary depending on the size of equipment used to produce the ozone gas. The ozone is added to the fluid at a molecular level. The specific gravity of the ozone, at 48 atomic mass units (amu), stays in the power fluid without bubbling out.

The term "power fluid" refers to a liquid containing oxidant that is the motive fluid that is pumped down hole to create the venture effect which causes a pressure drop at a nozzle of the venturi jet pump.

The term "produced fluid stream" refers to fluid produced from the reservoir after having been separated from the power fluid.

The term "source well" refers to an in-ground well that provides make-up water to enhance secondary or tertiary recovery in oil field production.

The term "tubing" refers to a conduit placed down hole in the wellbore which is capable of withstanding pressures from 5,000 psi to 20,000 psi without deforming. For example, tubing can have an inner diameter from 1.049 inch to 3.92 inch. Tubing can be coiled tubing or joints of connected tubing. Tubing can be made from steel. For example, usable tubing can be 4.5 inch outer diameter steel tubing known as L-80 grade capable of 19,600 psi internal yield pressure.

The term "venturi jet pump" refers to a pump without moving parts functioning as an artificial lift device that creates a pressure drop down hole to produce wellbore fluids, wellbore gasses or mixtures of fluid, gas and particulate.

DETAILED DESCRIPTION OF THE EMBODIMENTS

Before explaining the present method in detail, it is to be understood that the method is not limited to the particular embodiments and that it can be practiced or carried out in various ways.

The invention is a method for neutralizing hydrogen sulfide in a well by installing a venturi jet pump between a packer and a tubing string in a reservoir, injecting an oxidant into forming a power fluid using a surface tension modification generator; continuously injecting the power fluid into tubing in the source well or oil field production well at 50 psi-5000 psi to an inlet nozzle of the venturi jet pump.

Velocity increases and pressure decreases on the power fluid as fluid flows through the inlet nozzle.

Simultaneously drawing in reservoir fluid and mixing with the power fluid in a draw down chamber forming a molecularly mixed fluid.

Mixing oxidant with reservoir fluid for 0.1 to 10 seconds to scavenge hydrogen sulfide, methyl sulfide and/or explode cell membranes of anaerobic bacteria of the reservoir and discharging the treated stream from the venturi jet pump up an annulus of the wellbore to the surface.

The invention prevents human death because hydrogen sulfide is eliminated from the reservoir fluid so that operators at the production well site cannot breathe it in and die.

The invention stops environmental pollution because the method contemplates a recycle loop that prevents spillage onto the ground of produced fluids prior to separation. The invention stops pollution by reducing exposure of the hydrogen gas from the well which can kill fish and animals.

The invention stops fires and explosions caused by corrosion of oil field equipment because the invention converts corrosive materials in the produced fluids into non-corrosive material preventing degradation of metal equipment and thermoplastic seals.

The invention provides water in the production that flows through a high-pressure pump to a surface tension lowering reduction device making uniform laminar flow and minimizing emulsification of crude oil.

The subject matter of U.S. Pat. No. 7,048,786, which is owned by one of the inventors is incorporated herein by reference.

Turning now to the Figures, FIG. 1 shows the apparatus which includes a surface tension modification generator (STMG) 10 with a chamber 11 containing at least two probes 12 and 14 or a magnet with a coil (not shown).

The probes 12 and 14 are located in a wall of the outer chamber and contact the fluid 16 from an outside source. The probes 12 and 14 work in pairs, one probe emitting a frequency and transmitting the frequency through the fluid 16 to a second probe which receives the frequency, causing the modification of the molecules in the fluid. The frequency waves may be of any suitable type. For example, the frequency waves utilized maybe ultrasound, radio frequency (Rf), or electromagnetic.

In one embodiment, a first pair of probes generates and receives a first frequency, and a second pair of probes generates and receives the same frequency as the first set of probes. In another embodiment a first pair of probes generates and receives a first frequency and a second pair of probes generates and receives a second frequency. In still another embodiment, the first pair of probes can generate a first variable frequency pattern and a second pair of probes can generate the same variable frequency pattern. In yet another embodiment, the first pair of probes can generate a first variable frequency while a second pair of probes generates a second variable frequency. More probe pairs can be used with the same or different frequencies to the first pair of probes, depending on the size of the chamber in the STMG.

In embodiments, not shown, the apparatus which includes a frequency generator connected by a wire to a surface tension modification generator (STMG) 10 with a chamber 11 containing at least one conductive wire. The one conductive wire encircles a magnet. The magnet emits a frequency and transmitting the frequency through the fluid causing modification of the molecules in the fluid.

In still another embodiment, not shown, the magnet can generate a variable frequency pattern.

The embodiment of the STMG 10 with magnet and coil emits a frequency from about 0.05 Hz to about 25,000,000 Hz into the fluid through the magnet to minimize hydrogen bonding in the fluid. Frequencies are selected depending on the desired performance of the bacteria. Some frequencies can enhance bacteria performance, other frequencies can kill the bacteria which stops the processing of the solids or other matter in the fluid.

The STMG 10 depicted in FIG. 1, emits a frequency from about 0.05 Hz to about 25,000,000 Hz into the fluid 16 through the probes 12 and 14 to minimize hydrogen bonding in the fluid 16. Frequencies are selected depending on the desired performance of the bacteria. Some frequencies can enhance bacteria performance, other frequencies can kill the bacteria which stops the processing of the solids or other matter in the fluid.

The radio frequency that can be used herein can be two or more distinct Rf signals having variable ranges and pulse signals. The Rf signal generators, along with signal boosters and/or antenna, can cooperate to provide an improved electrostatic apparatus useful in particular surface tension reducing applications for fluids in order to enhance the oxygenation process. Similarly, the STMG can utilize a frequency created from a magnetic field generation apparatus.

The STMG 10 can be powered from an energy source 18 but the external energy source is not used when a magnetic field generator is used.

The STMG 10 is in fluid communication with a multi-chambered device 8 which has an inner chamber and an outer chamber. Inner chamber 20 has an axis 17. The inner chamber 20 has an inlet for receiving pressurized fluid from the STMG. The inner 20 chamber also receives a gas via a port 13 disposed between the STMG and the inner chamber.

The port 13 is shown for delivering gas from a gas source to the inside chamber, wherein the port in an embodiment is a venturi effect generator. Although the embodiments described emphasize oxygen and ozone, the gas source can provide oxygen, ozone, air, chlorine dioxide, ethylene, carbon dioxide, carbon monoxide, ethylene oxide, and other gases or combinations thereof.

The port can be a venturi effect generator, such as a Model 2081 from Mazzei Injectors of Ventura, Calif. The port can cause a drop in pressure of the fluid from the STMG 10 to the inner chamber.

The inner chamber 20 with an interior side 26, and exterior side 28 is adapted to support the lowered pressure of the fluid result from influence provided by the Venturi effect generator.

As an example, in an apparatus according to the invention having a flow rate of 80 gallons a minute the STMG chamber pressure would be 50 psi. After the port, and entering the inner chamber, the pressure on the fluid would drop to 20 psi.

An inner chamber is surrounded and enclosed by the outer chamber and the inner chamber provides a fluid contact between the two chambers.

In one embodiment, the outer chamber 22 can be a tube with an outside chamber outlet 32. The outer chamber and walls can have various shapes, cylindrical, square, rectangular as long as it contains the inner chamber which can also be tubular and cylindrical, or be hollow with rectangular shapes, or other orthogonal shapes.

In an embodiment the outer chamber could be up to 2 feet long, with a diameter of about 4 inches, and wall thicknesses of about ¼ inch. The inner chamber could be 18 inches long, with a diameter of 2 inches and a wall thickness of about ⅜ inch.

The outer chamber is adapted to support a second pressure that is less than the first pressure in the inner chamber. The outer chamber can be up to 75% less in pressure than the inner chamber. For example, the inner chamber can have a pressure of 20 psi and the outer chamber would have a pressure of 5 psi.

The thickness of the outer chamber wall should be adequate to support the pressure in the outer chamber without deforming.

The outer chamber and the inner chamber can be made of a variety of materials including polyvinyl chloride, stiff elastomeric materials, fiberglass resin, CPVC resin, glass, metals, including stainless steel, plastic composites, or combinations of these materials. The outer chamber can be coated or fiber wrapped.

The outer chamber can be connected to an inner chamber by welding, if the outer chamber has walls of stainless steel, or if made of plastic or PVC, the chamber walls can be connected through a melted engagement, or the multichambered device can have one chamber of metal, such as the outside chamber and the inner chamber can be a polymer.

The chambers in an alternative embodiment, can be adhered together, such as with epoxy, or a similar strong adhesive. If glass is used to form the multichambered device, it is contemplated that the glass would be glazed together. It is also contemplated that the chambers could be threaded together, clipped or otherwise fastened together in a non-removable fashion, which is also leak-tight.

The fluid to be treated can include liquids, mixtures, suspensions, solutions, suspended solids, fluidized solids or combinations thereof.

In one embodiment, the multi-chambered device would treat water, which can enter the device at a flow rate of about 80 gallons per minute, but it could be as slow as 5 gallons per minute and up over 500 gallons per minute, and even more. Oxygen would be flowed through the port at about 50 standard cubic feet per hour for the 80 gallons per minute embodiment, and could range from 3 standard cubic feet per minute to over 200 standard cubic feet per minute.

Continuing with FIG. 1, the inner chamber has at least two funnels 34*a-b* in the wall of the inner chamber. The funnels are directed toward a focal point that causes a turbid fluid condition to enhance the dissolving of oxygen into the fluid on a molecular level.

FIG. 2 shows three funnels 34*a-c* formed in the inner chamber 20 and directed at the outer chamber 22. In this embodiment, the funnels 34*a-c* are angled from about 45 to about 90 degrees from the axis 17 of the inner chamber.

The three funnels 34*a-c* of this figure are directed generally toward each other forming a focal point, which creates a turbid fluid area that causes oxygen to dissolve into the turbid fluid creating oxygenated fluid. This means, each funnel is generally directed toward the other two funnels of the trio, when three funnels are used.

FIG. 3 shows a cross section of an inner chamber with the 3 funnels 34*a-c* directed at the outer chamber. The funnels 34*a-c* are all aligned at from about a 45 to about 90 degree angle to the axis 17.

FIG. 4 depicts a cross section of one of the funnels 34*a*. The funnel 34*a* has a large opening 36 on the interior side 26 and a small opening 38 on the exterior side 28.

The small opening is located on the exterior side of the inner chamber and the large opening is located on the interior side of the inner chamber.

In this FIG. 4, the funnels are angled from about 45 degrees to about 90 degrees from the axis of the inner chamber. The funnels are generally directed toward each other forming this turbid focal point, which is the result of a triangulation of the three funnels.

In other embodiments, the apparatus can include from three funnels to twenty-four funnels in the walls of the outer chamber, but up to 168 funnels or more can be used within the scope of the invention. Each funnel can have a large opening with a diameter from about ⅛ inch to about ¼ inch.

In an embodiment, the funnels can be located equidistant around the inner chamber.

In an alternative embodiment, the funnels can be disposed around the inner chamber at orientations 45 degrees, 90 degrees, and 180 degrees off the inner chamber axis.

The apparatus flows the fluid, which can be water, to be treated into the inner chamber at a first pressure and out of the inner chamber at a second pressure forming a lower pressure oxygenated stream in the outer chamber.

The first pressure can be from about 5% to about 40% greater than the second pressure. The fluid pressure drops as the fluid flows through the apparatus.

The outer chamber receives the oxygenated stream from the inner chamber.

The outer chamber can be a pipe or tube with an inner diameter ranging from about 2 inches to about 25 inches.

Utilizing the embodied devices enables electrochemical changes to occur that lowers the hydrogen bonding of water molecules; inhibits scale and corrosion formation; dissolves existing scale and corrosion; increases the cleaning power of water; slows or eliminates the uptake of metals into cellular structure.

The embodied devices improve the performance of equipment, such as reverseosmosis units by lowering the surface tension of salt contaminated water by anionic flooding.

The "energized" water as the term is used herein, that is an end product using the embodied devices has measurable benefits to all types of life forms, fluids, objects and processes. The "energized" water or other similar "energized" fluid is created by treating a source fluid with the embodied device to form an energized fluid bearing a negative charge.

The embodied electrostatic apparatus can subject the source fluid to a combination signal that includes a voltage spike and at least two controlled Rf signals with different radio frequencies.

The source fluid can include any known fluid, water, water-based fluids, or organic fluids. The source fluid can be a solution, suspension, emulsion, colloid, gel, or other such fluid. The energized fluid does not have to be de-energized before the fluid is used in manufacture, storage, transportation, relocation, and identification processes.

FIGS. 5A and 5B depict a cross sectional view and a detailed cross-sectional view of an embodiment of the venturi jet pump assembly usable in the novel method.

The venturi jet pump 218 has an inlet nozzle 220. The inlet nozzle can have a variable inner diameter, and provide a conical passage with the initial opening being wider than the exit into the draw down chamber 222. The inlet nozzle 220 forms an increased velocity power fluid 225.

The draw down chamber 222 of the venturi jet pump draws in reservoir fluid 223 forming a molecularly mixed fluid 224.

A mixing tube 228 is connected to the draw down chamber 222. The mixing tube receives the increased velocity power fluid 225 and causes reacting of oxidant in the power fluid with the reservoir fluid in a period of time from 0.1 to 10 seconds forming a treated stream 230.

The treated stream 230 flows to a diffuser 234 connected downstream of the mixing tube and an outlet port 236 fluidly connected to the diffuser.

The diffuser 234 decreases velocity of the treated stream 230 and increases pressure of the treated stream 230.

The treated stream 230 flows to an annulus 240 of the wellbore 250 and to the surface 252.

FIGS. 5A-B also shows the surface tension modification generator (STMG detailed in FIGS. 1-4) 10 that continuously inject the power fluid 221 flowing from a power fluid reservoir into tubing in the wellbore. The surface tension modification generator injects oxidant into the power fluid.

FIGS. 5A-B also shows a surface pump 264 connected between the power fluid reservoir 266 and the tubing 262.

The surface tension modification generator 10 not only injects oxidant into the power fluid but additionally treats the surface tension of the power fluid with frequency.

FIG. 6A-B is a diagram of steps of the novel method.

The method for neutralizing hydrogen sulfide in a source well or an oil field production well includes the steps:

Step 100 install a venturi jet pump between a packer and a tubing string installed in a wellbore of source well or a wellbore of an oil field production well in a reservoir.

Step 102 inject an oxidant into water above ground forming a power fluid with a surface tension modification generator.

Step 104 continuously inject the power fluid into tubing in the source well or oil field production well at an initial surface pressure between 50 psi and 5000 psi to an inlet nozzle of the venturi jet pump.

Step 106 increase velocity and decrease pressure of the power fluid as the power fluid traverses the inlet nozzle forming an increased velocity power fluid.

Step 108 simultaneously draw reservoir fluid from the reservoir into the venturi jet pump and mix the increased velocity power fluid with reservoir fluid in a draw down chamber of the venturi jet pump forming a molecularly mixed fluid.

Step 110 in a mixing tube of the venturi jet pump connected to the drawn down chamber, reacting the oxidant with the reservoir fluid in a period of time from 0.1 seconds to 10 seconds to perform at least one of: scavenge hydrogen sulfide forming a sulfate; scavenge methyl sulfide forming a sulfate; and explode cell membranes of anaerobic bacteria of the reservoir fluid forming a treated stream.

Step 112 discharge the treated stream from the venturi jet pump up an annulus of the wellbore to the surface.

Step 114 separate the treated stream into a power fluid and a produced fluid stream.

A method for neutralizing hydrogen sulfide in a source well or an oil field production well comprising the steps of: install a venturi jet pump between a packer and a tubing string installed in a wellbore of source well or a wellbore of an oil field production well in a reservoir; inject an oxidant into water above ground forming a power fluid with a surface tension modification generator; continuously inject the power fluid into tubing in the source well or oil field production well at an initial surface pressure between 50 psi and 5000 psi to an inlet nozzle of the venturi jet pump; increase velocity and decrease pressure of the power fluid as the power fluid traverses the inlet nozzle forming an increased velocity power fluid; simultaneously draw reservoir fluid from the reservoir into the venturi jet pump and mix the increased velocity power fluid with reservoir fluid in a draw down chamber of the venturi jet pump forming a molecularly mixed fluid; in a mixing tube of the venturi jet pump connected to the drawn down chamber, reacting the oxidant with the reservoir fluid in a period of time from 0.1 to 10 seconds to perform at least one of: scavenge hydrogen sulfide forming a sulfate; scavenge methyl sulfide forming a sulfate; and explode cell membranes of anaerobic bacteria of the reservoir fluid forming a treated stream.

The method includes the step of discharging the treated stream 230 from the venturi jet pump up an annulus of the wellbore to the surface; and separate the treated stream into a power fluid and a produced fluid stream.

In embodiments of the method, the tubing is production tubing or an annulus.

In embodiments of the method, power fluid includes 0.2 wt % to 5 wt % oxidant based on the total weight of the power fluid; and 95 wt % to 99.8 wt % of liquid based on the total weight of the power fluid.

In embodiments of the method, the liquid is water.

In embodiments of the method, the venturi jet pump includes: a diffuser connected downstream of the mixing tube and an outlet port fluidly connected to the diffuser.

In embodiments of the method, the inlet nozzle of the venturi jet pump decreases pressure of the power fluid from 5000 psi to 50 psi.

In embodiments of the method, the increased velocity power fluid increases in velocity from 5 ft/sec to 500 ft/sec.

In embodiments of the method, the reservoir fluid is drawn into the venturi jet pump at a ratio of reservoir fluid to increased velocity power fluid from 10:1 to 1:1.

In embodiments of the method, the sulfate is a member of the group: calcium sulfate, potassium sulfate, sodium sulfate, and metal sulfate.

In embodiments of the method, the injecting of an oxidant into water above ground forms a power fluid using a conical surface diffuser with an entry port is larger than the exit port.

The invention relates to a method for neutralizing hydrogen sulfide.

The surface tension modification generator (STMG) 10 has an STMG chamber for receiving a pressurized fluid at a first pressure, at least a pair of probes disposed in the STMG chamber with a first probe for emitting a frequency from about 0.01 Hz to about 25,000,000 Hz, into the fluid and a second probe causing the emitted frequency to travel through the fluid for a defined distance to modify a physical characteristic of the fluid forming an altered fluid; a multi-chambered device for receiving the altered fluid from the STMG, wherein the multi-chambered device comprises: an inner chamber, wherein the inner chamber is for supporting altered fluid at a second pressure, wherein the inner chamber comprises an inner chamber axis and an inner chamber inlet for receiving altered fluid; an outer chamber enclosing the inner chamber for receiving fluid from the inner chamber, wherein the outer chamber further comprises an a outer chamber outlet, and wherein the fluid is at a third pressure in the outer chamber; at least two funnels for flowing fluid from the inner chamber to the outer chamber and creating a turbid fluid condition at a focus point to dissolve gas into the fluid forming dissolved gas in a fluid mixture; and a port connected causing a fluid pressure drop from the STMG to the inner chamber, and wherein the port can be used for flowing gas into the inner chamber, and wherein the first pressure is greater than the second pressure.

In embodiments of the method, from about 2 to about 12 probes are used in the STMG generator.

In embodiments of the method, at least one pair of probes generates and receives a first frequency, a second pair of probes generates and receives either the first frequency or a second frequency.

In embodiments of the method, a plurality of pairs of probes are used in the STMG, and at least one pair of probes generates and receives a frequency different from a generated and received frequency from a second pair of probes.

In embodiments of the method, the quantity of funnels in the STMG channel ranges from 2 to 24 funnels with each funnel angled from about 45 to about 90 degrees from the axis of the inner chamber.

In embodiments of the method, each funnel is generally directed toward the focus point of another funnel.

In embodiments of the method, the port is a venturi effect generator.

In embodiments of the method, the port causes a pressure drop from the STMG to the inner chamber.

In embodiments of the method, the STMG generates a variable frequency or the STMG utilizes a frequency created from a magnetic field generator.

In embodiments of the method, the first pressure is a high pressure, the second pressure is between the first pressure and a third pressure, and the third pressure is lower than the first pressure.

Example

The invention is a method for neutralizing hydrogen sulfide in an oil field production well such as sour West Texas, Permian Basin well.

The method involves a first step 100 to install a Model 3.1 venturi jet pump made by Tech-Flo of Conroe, Tex. between a packer and a tubing string installed in the wellbore of an oil field production well in a reservoir.

Step 101 involves setting up a surface tension modification generator adjacent the oil field production well, and connected to a power fluid reservoir containing water.

Step 102 involves injecting an oxidant, in this Example, ozone, into the water from the power fluid reservoir, above ground forming a power fluid with oxidant.

Step 104 involves flowing the power fluid with injected oxidant at a rate of 60 gallons per minute continuously into tubing in the oil field production well at an initial surface pressure 4000 psi to an inlet nozzle of the venturi jet pump downhole.

Step 106 involves increasing velocity while simultaneously decreasing pressure of the power fluid with oxidant as the power fluid with oxidant traverses the inlet nozzle forming an increased velocity power fluid in the venturi jet pump downhole.

Step 108 has the venturi jet pump simultaneously drawing reservoir fluid from the reservoir into the venturi jet pump and mixing the increased velocity power fluid with reservoir fluid in a draw down chamber of the venturi jet pump forming a molecularly mixed fluid. In this example, the production rate can be 2000 barrels per day into the venturi jet pump.

Step 110 involves mixing in a mixing tube of the venturi jet pump connected to the drawn down chamber, to react the oxidant with the reservoir fluid in a period of time from 0.5 seconds to 10 seconds to scavenge hydrogen sulfide forming a sulfate and simultaneously explode cell membranes of anaerobic bacteria of the reservoir fluid forming a treated stream.

Step 112 involves discharge the treated stream from the venturi jet pump up an annulus of the wellbore to the surface.

Step 114 involves separating the treated stream into a power fluid and a produced fluid stream.

While these embodiments have been described with emphasis on the embodiments, it should be understood that within the scope of the appended claims, the embodiments might be practiced other than as specifically described herein.

What is claimed is:

1. A method for neutralizing hydrogen sulfide (H2S) in wellbore comprising:
   a. providing a venturi jet pump having an inlet nozzle between a packer and a tubing string in a wellbore in a reservoir;
   b. injecting an oxidant into water to form a power fluid with a surface tension modification generator;
   c. injecting the power fluid at an initial surface pressure into the tubing in the wellbore through the venturi jet pump thereby increasing the velocity and decreasing the pressure of the power fluid as the power fluid traverses the inlet nozzle forming an increased velocity power fluid;

e. drawing a reservoir fluid from the reservoir into the venturi jet pump and mixing the increased velocity power fluid with reservoir fluid in a draw down chamber of the venturi jet pump forming a molecularly mixed fluid;

f. in a mixing tube of the venturi jet pump connected to the drawn down chamber, reacting the oxidant of the molecularly mixed fluid with the reservoir fluid to:
  (i) scavenge hydrogen sulfide forming a sulfate;
  (ii) scavenge methyl sulfide forming a sulfate; or
  (iii) explode cell membranes of anaerobic bacteria of the reservoir fluid.

2. The method of claim 1 wherein the mixture of the molecularly mixed fluid and the reservoir fluid is formed into a treated stream which is discharged from the venturi jet pump up an annulus of the wellbore to the surface.

3. The method of claim 2 wherein the treated stream is separated into a power fluid and a produced fluid stream.

4. The method of claim 1 wherein the initial surface pressure of the power fluid when injected into the tubing is between 50 psi and 5000 psi to an inlet nozzle of the venturi jet pump.

5. A method for neutralizing hydrogen sulfide (H2S) in wellbore comprising a source well or a production well, with a venturi jet pump and oxidants, the method comprising the steps of:

a. install a venturi jet pump between a packer and a tubing string installed in a wellbore of source well or a wellbore of an oil field production well in a reservoir;
  b. inject an oxidant into water above ground forming a power fluid with a surface tension modification generator;
  c. continuously inject the power fluid into tubing in the source well or oil field production well at an initial surface pressure between 50 psi and 5000 psi to an inlet nozzle of the venturi jet pump;
  d. increase velocity and decrease pressure of the power fluid as the power fluid traverses the inlet nozzle forming an increased velocity power fluid;
  e. simultaneously draw reservoir fluid from the reservoir into the venturi jet pump and mix the increased velocity power fluid with reservoir fluid in a draw down chamber of the venturi jet pump forming a molecularly mixed fluid;
  f. in a mixing tube of the venturi jet pump connected to the drawn down chamber, reacting the oxidant of the molecularly mixed fluid with the reservoir fluid in a period of time from 0.1 to 10 seconds to perform at least one of:
    (i) scavenge hydrogen sulfide forming a sulfate;
    (ii) scavenge methyl sulfide forming a sulfate; and
    (iii) explode cell membranes of anaerobic bacteria of the reservoir fluid forming a treated stream;
  g. discharge the treated stream from the venturi jet pump up an annulus of the wellbore to the surface; and
  h. separate the treated stream into a power fluid and a produced fluid stream.

6. The method for neutralizing hydrogen sulfide (H2S) of claim 5, wherein the tubing is production tubing or an annulus.

7. The method for neutralizing hydrogen sulfide (H2S) of claim 5, for wherein the power fluid comprises: 10 (i) 0.2 wt % to 5 wt % oxidant based on the total weight of the power fluid; and (ii) 95 wt % to 99.8 wt % of liquid based on the total weight of the power fluid.

8. The method for neutralizing hydrogen sulfide (H2S) of claim 7, wherein the liquid is water and the oxidant is a member of the group comprising at least one of: ozone, chlorine dioxide; a hydrogen peroxide or hydrogen.

9. The method for neutralizing hydrogen sulfide (H2S) of claim 5, wherein the venturi jet pump comprises: a diffuser connected downstream of the mixing tube and an outlet port fluidly connected to the diffuser.

10. The method for neutralizing hydrogen sulfide (H2S) of claim 5, wherein the inlet nozzle of the venturi jet pump decreases pressure of the power fluid from 5000 psi to 50 psi.

11. The method for neutralizing hydrogen sulfide (H2S) of claim 5, wherein increased velocity power fluid increases in velocity from 5 ft/sec to 500 ft/sec.

12. The method for neutralizing hydrogen sulfide (H2S) of claim 5, wherein the reservoir fluid is drawn into the venturi jet pump at a ratio of reservoir fluid to increased velocity power fluid from 10:1 to 1:1.

13. The method for neutralizing hydrogen sulfide (H2S) of claim 5, wherein the sulfate is a member of the group: calcium sulfate, potassium sulfate, sodium sulfate, and metal sulfate.

14. The method for neutralizing hydrogen sulfide (H2S) of claim 5, wherein the injecting of an oxidant into water above ground forming a power fluid is with a conical surface diffuser with an entry port is larger than the exit port.

15. The method for neutralizing hydrogen sulfide (H2S) of claim 5, wherein the surface tension modification generator (STMG) comprises:

a. an STMG chamber for receiving a pressurized fluid at a first pressure, at least a pair of probes disposed in the STMG chamber with a first probe for emitting a frequency from about 0.01 Hz to about 25,000,000 Hz, into the fluid and a second probe causing the emitted frequency to travel through the fluid for a defined distance to modify a physical characteristic of the fluid forming an altered fluid;
  b. a multi-chambered device for receiving the altered fluid from the STMG, wherein the multi-chambered device comprises:
    (i) an inner chamber, wherein the inner chamber is for supporting altered fluid at a second pressure, wherein the inner chamber comprises an inner chamber axis and an inner chamber inlet for receiving altered fluid;
    (ii) an outer chamber enclosing the inner chamber for receiving fluid from the inner chamber, wherein the outer chamber further comprises an outer chamber outlet, and wherein the fluid is at a third pressure in the outer chamber;
    (iii) at least two funnels for flowing fluid from the inner chamber to the outer chamber and creating a turbid fluid condition at a focus point to dissolve gas into the fluid forming dissolved gas in a fluid mixture; and
    (iv) a port connected causing a fluid pressure drop from the STMG to the inner chamber, and wherein the port can be used for flowing gas into the inner 5 chamber, and wherein the first pressure is greater than the second pressure.

16. The method for neutralizing hydrogen sulfide (H2S) of claim 15, wherein from about 2 to about 12 probes are used.

17. The method for neutralizing hydrogen sulfide (H2S) of claim 16, wherein at least one pair of probes generates and receives a first frequency, a second pair of probes generates and receives either the first frequency or a second frequency.

18. The method for neutralizing hydrogen sulfide (H2S) of claim 17, wherein a plurality of pairs of probes are used in the STMG, and at least one pair of probes generates and receives a frequency different from a generated and received frequency from a second pair of probes.

19. The method for neutralizing hydrogen sulfide (H2S) of claim 15, comprising a quantity of funnels in the STMG channel ranges from 2 to 24 funnels and wherein each funnel is angled from about 45 to about 90 degrees from the axis of the inner chamber.

20. The method for neutralizing hydrogen sulfide (H2S) of claim 15, wherein each funnel is generally directed toward the focus point of another funnel.

21. The method for neutralizing hydrogen sulfide (H2S) of claim 15, wherein the port is a venturi effect generator.

22. The method for neutralizing hydrogen sulfide (H2S) of claim 15, wherein the port causes a pressure drop from the STMG to the inner chamber.

23. The method for neutralizing hydrogen sulfide (H2S) of claim 15, wherein the STMG generates a variable frequency or the STMG utilizes a frequency created from a magnetic field generator.

24. The method for neutralizing hydrogen sulfide (H2S) of claim 15, wherein the first pressure is a high pressure, the second pressure is between the first pressure and a third pressure, and the third pressure is lower than the first pressure.

\* \* \* \* \*